US008532204B2

(12) United States Patent
Jiang

(10) Patent No.: US 8,532,204 B2
(45) Date of Patent: Sep. 10, 2013

(54) PEAK-TO-AVERAGE POWER RATIO (PAR) REDUCTION BASED ON ACTIVE-SET TONE RESERVATION

(75) Inventor: Sen Jiang, Beijing (CN)

(73) Assignee: STMicroelectronics (Beijing) R&D Co., Ltd., Beijing (CN)

( * ) Notice: Subject to any disclaimer, the term of this patent is extended or adjusted under 35 U.S.C. 154(b) by 339 days.

(21) Appl. No.: 12/860,142

(22) Filed: Aug. 20, 2010

(65) Prior Publication Data

US 2011/0158336 A1   Jun. 30, 2011

(30) Foreign Application Priority Data

Dec. 28, 2009   (CN) .......................... 2009 1 0265275

(51) Int. Cl.
    *H04L 27/28*   (2006.01)
(52) U.S. Cl.
    USPC .......................................... 375/260; 375/295
(58) Field of Classification Search
    USPC ......................................................... 375/260
    See application file for complete search history.

(56) References Cited

U.S. PATENT DOCUMENTS

| | | | |
|---|---|---|---|
| 6,400,773 B1 | 6/2002 | Krongold et al. | |
| 7,627,046 B1 * | 12/2009 | Dick et al. | 375/260 |
| 8,170,140 B2 * | 5/2012 | Jiang | 375/296 |
| 8,213,536 B2 * | 7/2012 | Jethanandani et al. | 375/296 |
| 8,254,478 B2 * | 8/2012 | Hellberg | 375/260 |
| 2005/0100108 A1 * | 5/2005 | Yun et al. | 375/260 |
| 2008/0002779 A1 * | 1/2008 | Carsello | 375/260 |
| 2010/0080113 A1 * | 4/2010 | Yang et al. | 370/210 |
| 2010/0329401 A1 * | 12/2010 | Terry | 375/346 |
| 2011/0122930 A1 * | 5/2011 | Al-Naffouri et al. | 375/219 |
| 2012/0114074 A1 * | 5/2012 | Moffatt et al. | 375/296 |

OTHER PUBLICATIONS

Brian S. Krongold and Douglas L. Jones,1 An Active-Set Approach for OFDM PAR Reduction via Tone Reservation, IEEE Transactions on Signal Processing, vol. 52, No. 2, pp. 495-509, Feb. 2004.
Alan Gatherer and Michael Polly, "Controlling clipping probability in DMT transmission," In Proceedings of the 31st Asilomar Conference on Signals, Systems, and Computers, 1997, pp. 578-584.
J.Tellado, Peak to Average Power Reduction for Multicarrier Modulation, Ph.D. thesis, Stanford University, 2000.
B.S. Krongold and D.L. Jones, "A new method for PAR reduction in baseband DMT systems," in 35th Asilomar Conference on Signals, Systems, and Computers, Pacific Grove, CA, Nov. 2001.

* cited by examiner

*Primary Examiner* — Chieh M Fan
*Assistant Examiner* — Santiago Gracia
(74) *Attorney, Agent, or Firm* — Graybeal Jackson LLP

(57) ABSTRACT

In an embodiment, a transmitter includes first and second processing blocks, which may each include hardware, software, or a combination of hardware and software. The first processing block is operable to generate a first peak-reducing vector. And the a second first processing block is operable to receive a first data vector, the data vector comprising a plurality of samples, the first data vector having a first peak with a first index and a first magnitude, a second peak with a second index and a second magnitude that is less than the first magnitude, and a first peak-to-average power ratio, and to generate a second data vector having a second peak-to-average power ratio that is lower than the first peak-to-average power ratio by using the first peak-reducing vector.

4 Claims, 6 Drawing Sheets

PEAK-TO-AVERAGE POWER RATIO (PAR) REDUCTION BASED ON ACTIVE-SET TONE RESERVATION

PRIORITY CLAIM

The instant application claims priority to Chinese Patent Application No. 200910265275.7, filed Dec. 28, 2009, which application is incorporated herein by reference in its entirety.

BACKGROUND

Multicarrier transmission has been widely adopted in both wired and wireless communication systems such as asymmetric digital subscriber line (ADSL) systems, Digital Video Broadcast (DVB), and wireless local/metropolitan area networks (WLAN/WMAN). Exploiting Discrete Multitone Modulation (DMT) or Orthogonal Frequency Division Multiplexing (OFDM), these systems may achieve greater immunity to multipath fading and impulse noise with lower cost. However, they may also suffer from high peak-to-average power ratios (PAR). Without an appropriate process to counter this problem, the high PAR of a transmitted signal may cause a high-power amplifier (HPA) to operate in its nonlinear region (i.e., the peak-to-peak amplitude of the transmitted signal may be high enough to saturate the amplifier), leading to significant performance degradation.

OFDM effectively partitions overall system bandwidth into a number of orthogonal frequency subchannels. These subchannels are also interchangeably referred to throughout as "tones" or "subcarriers." In an OFDM system, an input serial data symbol is separated into D groups. Each of the D groups may be mapped onto a quadrature amplitude modulated (QAM) constellation point, and then modulated onto a respective one of N subchannels (or tones) having approximately equal bandwidth and a frequency separation of approximately 1/T, where T is the time duration of an OFDM symbol during which all N groups are transmitted, and $D \leq N$. Generally, the larger the value of D, the larger the system bandwidth, and, because of a resulting quasi-Gaussian distribution in the resulting time-domain signal, the higher the PAR (for example, peak amplitude to average amplitude).

Tone reservation, which modulates reserved or unused ones of the N tones within the signal space to produce data-block-dependent peak-canceling signals, is a technique for reducing the PAR for these systems. That is, where $D<N$, one may modulate one or more of the unused ones of the N tones to reduce the PAR of the transmitted signal.

SUMMARY

A challenge in tone reservation is how best to produce that peak-canceling signal. Unfortunately, known solutions have typically involved high computational overhead, inaccuracy, or both.

According to an embodiment, a transmitter includes first and second processing blocks, which may each include hardware, software, or a combination of hardware and software. The first processing block is operable to generate a first peak-reducing vector. And the a second first processing block is operable to receive a first data vector, the data vector comprising a plurality of samples, the first data vector having a first peak with a first index and a first magnitude, a second peak with a second index and a second magnitude that is less than the first magnitude, and a first peak-to-average power ratio, and to generate a second data vector having a second peak-to-average power ratio that is lower than the first peak-to-average power ratio by using the first peak-reducing vector.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the subject matter disclosed herein. This disclosure is not intended to be limited to the embodiments shown, but is to be accorded the widest scope consistent with the principles and features disclosed or suggested herein.

In the following description, certain details are set forth in conjunction with the described embodiments to provide a sufficient understanding of the subject matter disclosed herein. One skilled in the art will appreciate, however, that the disclosed subject matter may be practiced without these particular details. Furthermore, one skilled in the art will appreciate that various modifications, equivalents, and combinations of the disclosed embodiments and components of such embodiments are within the scope of the disclosed subject matter. Embodiments including fewer than all the components or steps of any of the respective described embodiments may also be within the scope of the disclosed subject matter although not expressly described in detail below. Finally, the operation of well-known components and/or processes has not been shown or described in detail below to avoid unnecessarily obscuring the disclosed subject matter.

Figure 1:
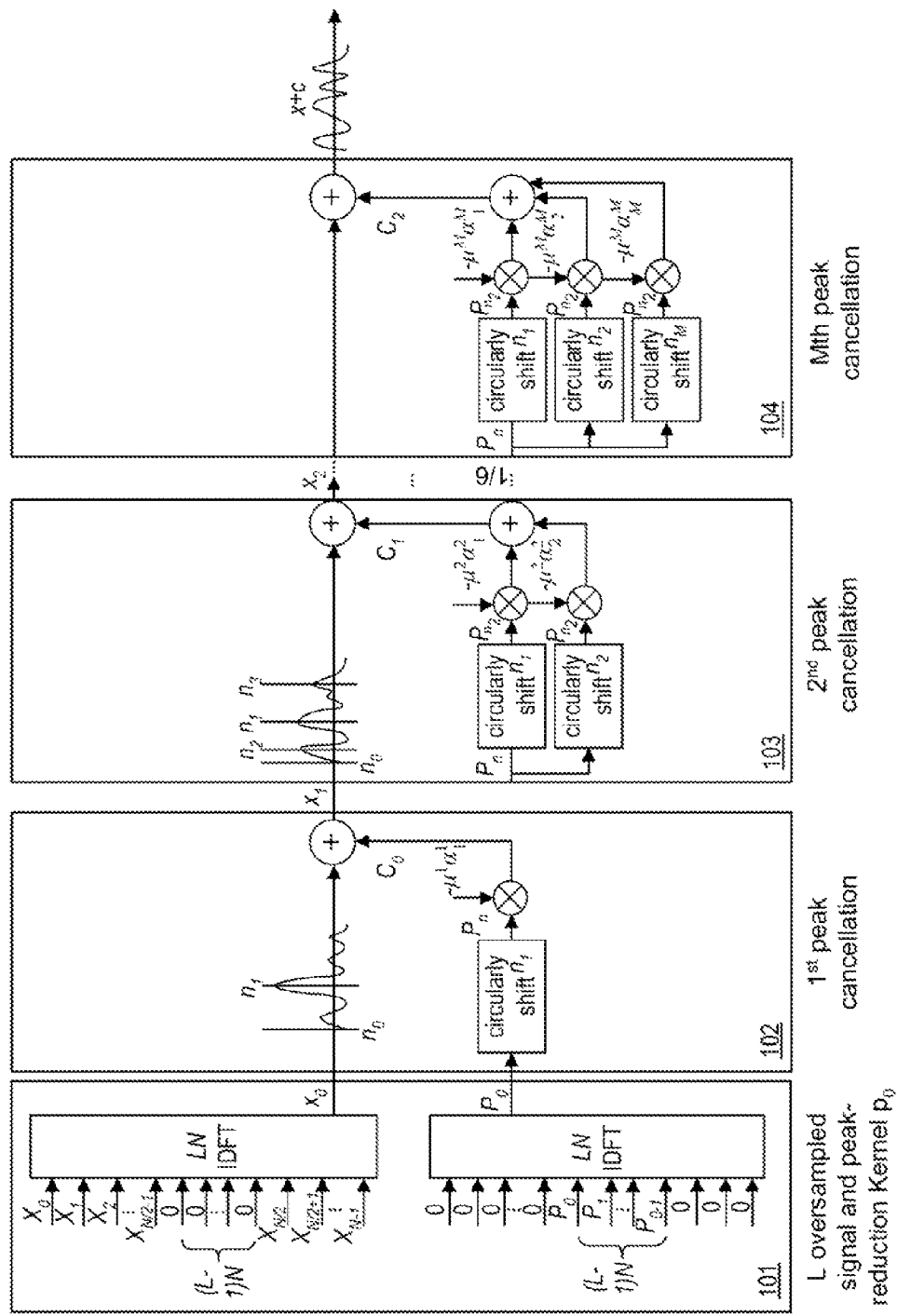
FIG. 1 illustrates an embodiment of an iterative method for PAR reduction using a peak-canceling vector.
Figure 3:
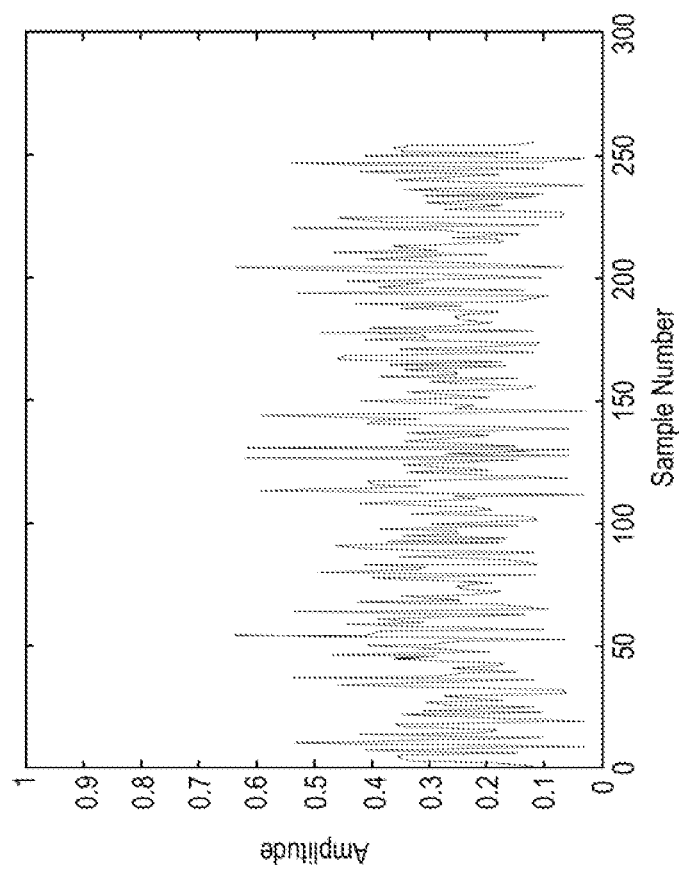
FIG. 3 is a plot of an example time-domain waveform that may be generated for the purpose of PAR reduction using reserved OFDM tones.

FIG. 1 illustrates an embodiment of an iterative method for PAR reduction using a peak-canceling vector. A time-domain data vector x(t), labeled $x_0$ for notational convenience, is the result of performing an Inverse Discrete Fourier Transform (IDFT) with an oversampling factor L on a frequency-domain OFDM symbol X that includes N information blocks $X_0 \ldots X_{N-1}$ respectively modulated on N subcarriers, plus D PAR reduction blocks $P_0 \ldots P_{D-1}$ respectively modulated on D subcarriers, where $D \leq (L-1)N$. A time-domain peak-canceling vector $p_0$, discussed in further detail below, is generated by performing an IDFT on a series of frequency impulses (ones) at one or more of the D reserved tones. An example of a peak-canceling vector $p_0$ is shown in FIG. 3.

If the PAR of the data vector $x^0$ is above a target threshold, then a first peak reduction is performed on the data vector $x^0$ by locating the sample $n_1$ of $x^0$ that has the greatest magnitude within the data vector; circularly shifting the peak-canceling vector $p_0$ by that number of samples $n_1$ to get a shifted peak-canceling vector $p_{n1}$; scaling $p_{n1}$ by a step size $-\mu_1^{\ 1}$ and complex coefficient $\alpha_1^{\ 1}$; and combining (e.g., summing) the original data vector $x^0$ with the shifted and scaled peak-canceling vector $p_{n1}$ to get a PAR-reduced data vector $x^1$. In this manner, in the vector $x^1$, the magnitude of the sample at $n_1$ is reduced to the magnitude of the sample at $n_2$ such that the magnitudes of $n_1$ and $n_2$ are substantially equal and are the greatest peak magnitudes of $x^1$. The step size $\mu$ is a real quantity, used to modify the magnitude of the vector $p_{n1}$. The complex coefficient $\alpha$ is a complex coefficient vector used to modify both the magnitude and phase of the data vector $p_{n1}$, because the peak at $n_1$ of $x^0$ has a phase as well as a magnitude, and so both the phase and magnitude of $p_{n1}$ are scaled so as to give the desired peak reduction at n1. Both $\mu$ and $\alpha$ are discussed in greater detail below.

In an embodiment, if the PAR of the data vector $x^1$ is above the target threshold, then a second peak reduction is performed on $x_1$ in a similar fashion. For this second iteration of peak reduction, the original peak-canceling vector $p_0$ is shifted by that number of samples $n_2$ to achieve a shifted peak-canceling vector $p_{n2}$. Both $\mu$ and $\alpha$ are regenerated. The shifted vector $p_{n2}$ is scaled by a step size $-\mu_2^{\ 2}$ and a complex coefficient $\alpha_2^{\ 2}$; the shifted vector $p_{n1}$ is scaled by a step size $-\mu_1^{\ 2}$ and a complex coefficient $\alpha_1^{\ 2}$. The complex coefficients $\alpha$ cause the samples $n_1$ and $n_2$ of the combined shifted and scaled peak-canceling vectors $p_{n1}$ and $p_{n2}$ to each have an appropriate magnitude and the same phase (positive or negative) as the samples $n_1$ and $n_2$ of $x^1$. The data vector $x^1$ is combined with these shifted and scaled peak-canceling vectors $p_{n1}$ and $p_{n2}$ to achieve the PAR-reduced data vector $x^2$. The real coefficients $\mu$ are used to reduce the magnitudes of $x^1$'s samples at $n_1$ and $n_2$ to substantially equal that of the sample at $n_3$ of $x^2$. These three peaks (located at samples $n_1$, $n_2$ and $n_3$) will have approximately the same magnitude value, which is the greatest magnitude value in $x^2$.

In an embodiment, individual peak cancellation is reiterated by repeating the above technique until the PAR of the resulting vector x equals or is less than the target threshold. In another embodiment, a maximum number of iterations number may be set even if the PAR of the resulting vector x is not less than the target threshold.

The time-domain waveform x(t) is the result of performing an IDFT on a frequency-domain OFDM symbol X, where the symbol X comprises N information blocks modulated on respective N subcarriers. For complex baseband OFDM systems, this time-domain waveform may be represented as:

$$x(t) = \frac{1}{\sqrt{N}} \sum_{n=0}^{N-1} X_n \cdot e^{j2\pi n \Delta f t}, \quad 0 \le t \le NT \quad (1)$$

where $X_n$, $\{n=0, 1, \ldots, N-1\}$ is the data symbol modulated onto the nth subchannel, $\Delta f=1/NT$ is the subcarrier spacing, T is the time duration of the OFDM symbol.

The PAR of this transmitted waveform x(t) is defined as:

$$PAR = \frac{\max_{0 \le t < NT} |x(t)|^2}{1/NT \cdot \int_0^{NT} |x(t)|^2 dt} \quad (2)$$

To use tone reservation, the LN subcarriers (wherein L is the oversampling factor) in the OFDM system are divided into two subsets: a subcarrier set U for useful data (the tones N are in the set U) and a subcarrier set $U^c$ for $D \le (L-1)N$ PAR reduction blocks selected to reduce the PAR. As an example, in an embodiment wherein the signal space comprises a total of LN=256 subcarriers, one might reserve for PAR reduction a set $U^c$ of D=11 of those subcarriers with indexes k=[5, 25, 54, 102, 125, 131, 147, 200, 204, 209, 247]. Expressing the sampled x(t) waveform as a sampled data vector x, one may also express a desired peak-cancelling waveform as a sampled vector c. The time-domain output of the transmitter $\bar{x}$ is the sum of the data vector x and peak-canceling vector c, which is given by:

$$\bar{x} = x + c = \text{IDFT}(X+C) \quad (3)$$

Note that frequency-domain vector $X=[X_0, X_1, \ldots, X_{N-1}]$ is only modulated over subcarriers N within the data-carrying subset U; likewise, frequency-domain vector $C=[C_0, C_1, \ldots, C_{N-1}]$ is only modulated over subcarriers D within the reserved-tone subset $U^c$. The vectors X and C cannot both be nonzero on a given subcarrier; that is, a subcarrier may be a member of U or of $U^c$, but cannot be a member of both U and $U^c$:

$$X_k + C_k = \begin{cases} X_k, k \in U \\ C_k, k \in U^c \end{cases} \quad (4)$$

C, therefore, is selected to reduce or minimize the PAR of the time-domain output signal $\bar{x}$ by way of its time-domain correlation c:

$$PAR = \frac{\max_{0 \le k \le NL-1} |x[k] + c[k]|^2}{E\{|x[k]|^2\}} \quad (5)$$

The calculation of a suitable vector for the time-domain vector c, without high computational overhead, may therefore result in PAR reduction for an OFDM system.

Figure 2:
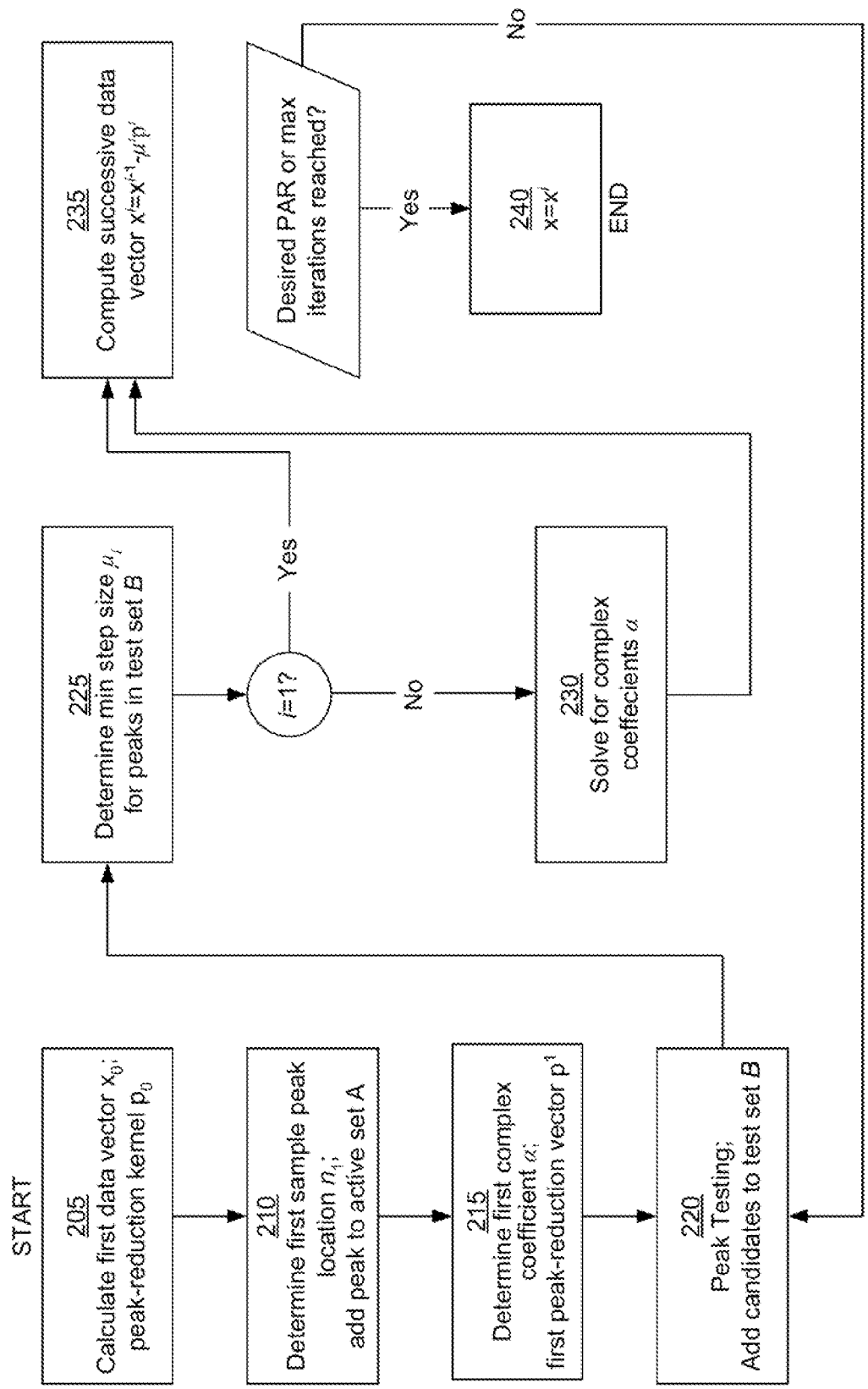
FIG. 2 is a flowchart of the embodiment of the iterative method for PAR reduction depicted in FIG. 1.

FIG. 2 illustrates an embodiment of a method for calculating a peak-cancelling vector to achieve PAR reduction. As described above with respect to FIG. 1, PAR reduction is performed iteratively, with a separate stage for cancellation of each successive peak in the time-domain data vector x, until a PAR threshold (or iteration threshold) is reached. A first peak of greatest magnitude within data vector x is found and reduced using a shifted peak-canceling vector scaled by real and complex coefficients until it is of substantially equal magnitude with another peak, e.g., the peak with the next greatest magnitude. With a combined peak-canceling vector which has unit magnitude and the phase of the reduced data vector at the locations of the two peaks, those peaks are reduced by an equal amount such that they then have a magnitude substantially equal to that of a third peak having the third greatest magnitude, and so on. In an embodiment, individual peak cancellation is reiterated until a target value for PAR is achieved. In another embodiment, a maximum iteration number M may be designated.

Starting in step 205, an N-subcarrier frequency symbol $X=\{X_0, X_1, \ldots, X_{N-1}\}$ is converted into a first time-domain sampled data vector $x^0$ using an Inverse Discrete Fourier Transform (IDFT) with L-times oversampling. A second L-oversampled vector $p_0$, termed the peak-reduction kernel, may be computed in such a way as to provide a time-domain impulse at sample number n=0 with the D reserved tones within set $U^c$. That is, to form the vector $p_0$, the D reserved tones (the D subcarriers within set $U^c$) are set to "1+j0, all other tones in the subcarrier space (the N subcarriers within set U) are set to "0+j0", and an IDFT is performed to achieve the time-domain peak-reduction vector $p_0$, which is then normalized/scaled so that the vector $p_0$ has a maximum magnitude of 1 at the sample location n=0. The phases of the D reserved tones are adjusted such that ideally, $p_0$ has a peak of highest magnitude at n=0, and the magnitudes of the peaks at all the other sample locations are significantly lower (e.g., zero) than the peak at n=0. But because the set $U^c$ has a finite set of D tones, at least some of the peaks at the other sample locations n≠0 may have non-zero magnitudes.

In step 210, the first peak in data vector $x_0$ is determined such that the sample at that peak has the greatest magnitude in the vector. Let an iteration index i=1, and let $E^0$ be the maximum magnitude in $x_0$. Further, let sample $n_1$ be the location where $E^0$ is found. This sample $n_1$ is the location of the first peak within vector $x_0$ to be partially cancelled (i.e., reduced) to achieve PAR reduction. Also at step 210, this first peak is used to establish an active set of peaks A. At this point, the active set A contains only the first peak at sample location $n_1$.

In step 215, a first complex coefficient $\alpha_1^1$ is determined. Coefficient $\alpha_1^1$ is the complex ratio between the complex value of $x_0$ at sample location $n_1$ and the maximum magnitude $E^0$, such that $$p^1 = \alpha_1^1 p_{n_1} = \frac{x_{n_1}^0}{E^0} p_{n_1} \qquad (8)$$

where $p_{n_1}$ is obtained by circularly shifting peak-reduction kernel vector $p_0$ by $n_1$ samples, and $\chi_{n1}^0$ is the complex value of the sample $n_1$. Only $\alpha_1^1$ and $p^1$ are determined with equation (8); successive iterations, wherein the more generalized $p^i$ is calculated, are discussed below.

At step 220, peak testing is performed to locate samples in $x_{i-1}$ (which, for the first peak, is $x_0$) which are not yet in the active set A that possess large magnitudes relative to the other samples. These samples are candidates for peak balancing in the next step, and are placed in a test set B. For the very first peak reduction, active set A contains only the one peak at $n_1$. Because it is possible for multiple peaks to have the same magnitude, however, it is possible that multiple peaks may be added to active set A in a single iteration. In one embodiment, the magnitude of these samples may be approximated by simply taking the sum of the absolute values of a given sample's real and imaginary components. In still another embodiment, peak testing may be skipped entirely. However, if peak testing is skipped, then the test set B will include all samples not in active set A, which greatly increases the computational load necessary for the next step 225.

In step 225, the minimum step size $\mu^i$ is determined as the difference in magnitude between the maximum magnitude of current data vector $x^{i-1}$ and that of the next iteration $x_i$, such that $E^i = E^{i-1} - \mu^i$, and $\mu^i = E^{i-1} - E^i$. This minimum step size $\mu^i$ may also be found according to the following equation:

$$\mu^i = \min_{q \in B}\left(\frac{b_q - \sqrt{b_q^2 - a_q c_q}}{a_q} \geq 0\right) \qquad (9)$$

where $a_q = 1 - p_q^i(p_q^i)^*$, $b_q = E^{i-1} - \Re(x_q^{i-1}(p_q^i)^*)$, $c_q = (E^{i-1})^2 - x_q^{i-1}(x_q^{i-1})^*$. The complex conjugate of any variable a is denoted by $a^*$, and $\Re(\cdot)$ denotes the real part of a complex number. In embodiments wherein step 220 (peak testing) was skipped, the determination of minimum step size $\mu^i$ may be more computationally intensive because test set B will be much larger. In either case, the peaks within $x^{i-1}$ having the complex magnitude associated with $\mu^i$ are then added to active set A.

At this point, if the iteration index i=1 (i.e., we are in the process of reducing the magnitude of the first peak), then we have already calculated the complex coefficient $\alpha_1^1$ in step 215 and we can proceed to step 235 to calculate the next iteration of data vector $x_i$.

In step 230, the complex coefficients $\alpha$ are determined. As stated above, these complex coefficients are used both to scale the magnitude of the relevant peaks and to adjust the phase of those peaks such that at the locations within active set A the combined peak-reduction vector $p^i$ has unit magnitude and the same phase as the corresponding samples in $x_{i-1}$. To solve for the $\alpha$ coefficients, the following complex matrix equation is used:

$$\begin{bmatrix} 1 & p_{n_1-n_2} & \cdots & p_{n_1-n_i} \\ p_{n_2-n_1} & 1 & \cdots & p_{n_2-n_i} \\ \vdots & & & \vdots \\ p_{n_i-n_1} & p_{n_i-n_1} & \cdots & 1 \end{bmatrix} \begin{bmatrix} \alpha_1^i \\ \alpha_2^i \\ \vdots \\ \alpha_i^i \end{bmatrix} = \begin{bmatrix} S_{n_1} \\ S_{n_2} \\ \vdots \\ S_{n_i} \end{bmatrix} \qquad (10)$$

Where $p_n$ is the nth entry of $p_0$, and $$S_{n_j} = x_{n_j}^{i-1}/E^{i-1} \qquad (11)$$

All of the coefficients $\alpha$ are recalculated during each iteration, with the leftmost matrix of equation (10) gaining another row and column each time. In an embodiment, this i×i system of complex matrix equations may be replaced with a 2i×2i system of real equations. This and other simplification techniques are discussed in "*An Active-Set Approach for OFDM PAR Reduction via Tone Reservation*", Brian S. Krongold and Douglas L. Jones, IEEE Transactions on Signal Processing, Vol. 52, No. 2, pp. 495-509, February 2004, the contents of which article are incorporated herein by reference.

Once the coefficients $[\alpha_1^i, \alpha_2^i, \ldots, \alpha_i^i]$ are calculated in step 230, then:

$$p^i = \Sigma_{j=1}^i \alpha_j^i p_{n_j} \qquad (12)$$

The iterative data vector $x^i$ is determined by adding $p^i$, negatively scaled by the minimum step size $\mu^i$, to the prior iterative vector $x^{i-1}$, so that:

$$x_i = x_{i-1} - \mu^i p^i \qquad (13)$$

This has the result of reducing the magnitudes of a number, e.g., i, peaks in the active set by the magnitude of $\mu^i$.

The iteration index i is incremented such that i=i+1. If neither the maximum number of iterations nor the desired PAR value has been achieved, then the next iteration of peak reduction is begun by returning to step 220 for peak testing (or, in embodiments where peak testing is skipped, step 225 for directly finding the minimum step size).

If the desired PAR or maximum iterations M have been achieved, then the output $\bar{x}$ is equal to current data vector $x^i$.

Returning to FIG. 1, in the leftmost stage 101, a first Inverse Discrete Fourier Transform (IDFT) block 110 provides an LN-point oversampled time-domain vector x for each frequency block $X = \{X_0, X_1, \ldots, X_{N-1}\}$. Also in stage 201, a second IDFT block 120 calculates an LN-point oversampled vector $p_0$. This vector $p_0$ may be computed in such a way as to provide a time-domain impulse at sample number n=0 with the D reserved tones within set $U^c$, and scaling $p_0$ such that it possesses a value of 1 at the location n=0. Frequency-domain impulses occur for every reserved tone D in the set, so that $P = \{P_0, P_1, \ldots, P_{N-1}\}$. In one embodiment, these reserved tones are unchanging, so that the same frequency domain vector P may be used for all blocks X. In other embodiments, the reserved tones may vary depending on the value of X, such that P (and, therefore, p) are recalculated for each block X.

Stage 102 illustrates the first iteration of peak reduction. A first peak within data vector $x_0$, having the maximum magnitude $E^0$, is located at sample $n_1$ and added to an active peak set A (not shown). Reduction kernel vector $p_0$ is circularly shifted by that sample number $n_1$ so that the highest amplitude in $p_0$, formerly located at n=0, is now aligned at n=$n_1$. Test set B is achieved by peak testing to find those samples which are not yet in the active set A and possess large magnitudes relative to the other samples in $x_0$. Using equation (9), for example, this allows the determination of the minimum step size $\mu^1$, which is the difference in magnitude between the first peak, with magnitude $E^0$, and the peak with the second-greatest complex magnitude in $x_0$.

The first complex coefficient $\alpha_1^1$ is then determined, $p^1$ is found as $\alpha_1^1 p_{n_1}$, and $c^1$ is found as $p_{n_1}(-\mu^1 \alpha_1^1)$. By scaling $p_{n_1}$ by the complex coefficient $\alpha_1^1$, $p^1$ has the same phase as that of $x_0$ at $n_1$. By scaling $p^1$ by the negative step size $-\mu^1$, the magnitude of the peak at $n_1$ is reduced to substantially match that of the next peak or peaks to be reduced. This is reflected in the resulting vector $x^1$, which possesses both the peak located at sample $n_1$ as well as the secondary peak located at n=$n_2$ when determining the minimum step size $\mu^1$—but in the data vector $x^1$, each of those peaks possess substantially the same magnitude.

In stage 103, the process is repeated with iteration index i=2. Here, two peaks are being reduced: the first peak located at $n_1$, and another secondary peak located at $n_2$. The minimum step size $\mu^2$ may be found using equation (9) based on the peaks of data vector $x_1$ within the test set B; complex coefficients $\alpha_1^2$ and $\alpha_2^2$ are determined using equation (10); and the peak-reduction vector $c_2$ is found as $-\mu^2 p^2 = p_{n_1}(-\mu^2 \alpha_1^2) + p_{n_2}(-\mu^2 \alpha_2^2)$. The subsequent data vector is thus found as $x_2 = x_1 + c_2$. The coefficients $\alpha_1^2$ and $\alpha_2^2$ are calculated so that even if $p_{n_1}$ has a nonzero magnitude at sample $n_2$, the magnitude of the reduced peak at $n_2$ still substantially equals the magnitude of the peak at $n_3$, and even if $p_{n_2}$ has a nonzero magnitude at sample $n_1$, the magnitude of the reduced peak at $n_1$ still substantially equals the magnitude of the peak at $n_3$.

Stage 104 illustrates the Mth iteration of an embodiment of the peak reduction method. A total of M peaks are being reduced in complex magnitude simultaneously, with the first M−1 peaks already having been reduced by previous iterations. The output data vector is $\bar{x} = x + c$, where x is the original data vector given by IDFT(X) and c is the time-domain sum of $c_1 + c_2 + \ldots + c_M$.

Referring again to FIG. 1, an embodiment of the above-described PAR reduction technique is described with less emphasis on the mathematics and more emphasis on the physical phenomena.

Referring to block 101, an IDFT of an OFDM data signal is generated, and an IDFT of an OFDM peak-reduction kernel is generated. The OFDM data signal includes subcarriers that are selected for data transmission, and the OFDM peak-reduction kernel includes subcarriers that are not used for data transmission (e.g., because of excessive channel interference, distortion at the frequencies of these non-data subcarriers, or a desire to reserve those subcarriers for purposes of PAR reduction). The first IDFT yields a time-domain data signal $x_0$ having a duration equal to a symbol period, and the second IDFT yields a time-domain peak-reduction pulse $p_0$ also having a duration of one symbol period. An example of $p_0$ is plotted in FIG. 3. The first and second IDFTs may be performed by a processor or other circuitry in a transmitter.

Referring to block 102, the transmitter identifies the peaks of $x_0$ having the greatest magnitude and the second greatest magnitude as being located at sample locations $n_1$ and $n_2$, respectively.

Then, the transmitter circularly shifts $p_0$ to generate a peak-reduction pulse $p_{n_1}$ having its main peak at sample location $n_1$.

Next, the transmitter generates $-\mu^1$ having a value such that when added to the magnitude of $x_0$ at sample location $n_1$, $-\mu^1 \alpha_1^1 p_{n_1}$ causes the magnitude of the peak of $x_1$ at sample $n_1$ to equal, or approximately equal, the magnitude of the peak of $x_0$ at sample $n_2$, as shown in block 103. The transmitter then adds $-\mu^1 \alpha_1^1 p_{n_1}$ to $x_0$ to obtain the time-domain waveform $x_1$ in block 103.

Then, referring to block 103, the transmitter identifies the peaks of $x_1$ at sample locations $n_1$ and $n_2$ as having the greatest magnitude, and identifies the peak of $x_1$ at $n_3$ as having the second greatest magnitude.

Next, the transmitter circularly shifts $p_0$ to generate a peak-reduction pulse $p_{n_1}$ having its main peak at sample location $n_1$, and also circularly shifts $p_0$ to generate a peak-reduction pulse $p_{n_2}$ having its main peak at sample location $n_2$.

Then, the transmitter generates $-\mu^2$ having a value such that when added to the magnitude of $x^1$ at sample location $n_1$, $-\mu^2 \alpha_1^2 p_{n_1}$ causes the magnitude of the peak of $x_2$ at sample $n_1$ to equal, or approximately equal, the magnitude of the peak of $x_1$ at sample $n_3$. Furthermore, the transmitter generates $\alpha_1^2$ and $\alpha_2^2$ such that the magnitude of $x_2$ at sample location $n_2$ is approximately equal to the magnitude of $x_1$ at the sample location $n_3$ even if the magnitude of $p_{n_1}$ at sample location $n_2$ is nonzero.

Because the magnitudes of $x_1$ at sample locations $n_1$ and $n_2$ are substantially equal to one another, when added to the magnitude of $x_1$ at sample location $n_2$, $-\mu^2 \alpha_2^2 p_{n_2}$ causes the magnitude of the peak of $x_2$ at sample $n_2$ to equal, or approximately equal, the magnitude of the peak of $x_1$ at sample $n_3$. Furthermore, the transmitter generates as $\alpha_1^2$ and $\alpha_2^2$ such that the magnitude of $x_2$ at sample location $n_1$ is approximately equal to the magnitude of $x_1$ at the sample location $n_3$ even if the magnitude of $p_{n_2}$ at sample location $n_1$ is nonzero.

The transmitter then adds $-\mu^2 \alpha_1^2 p_{n_1}$ and $-\mu^2 \alpha_2^2 p_{n_2}$ to $x_1$ to obtain the time-domain waveform $x_2$, which is output from the block 104.

Referring to block 104, the transmitter continues in this manner for M−3 additional peaks until it generates a time-domain data signal $x_M$ having no peaks larger than a selected peak threshold, or until M equals a selected iteration threshold.

FIG. 3 is a plot of an example of a time-domain peak-reduction waveform $p_0$ that may be generated for the purpose of PAR reduction using reserved OFDM tones. In the embodiment depicted, the kernel $p_0$ is generated using D=11 reserved tones in a signal space having a total of LN=256 subcarriers. As discussed above, the kernel may have, therefore, been generated using a 256-point IDFT. One can see that the kernel $p_0$ has its greatest peak of approximately unity (normalized) magnitude at sample $n_0$.

Figure 4:
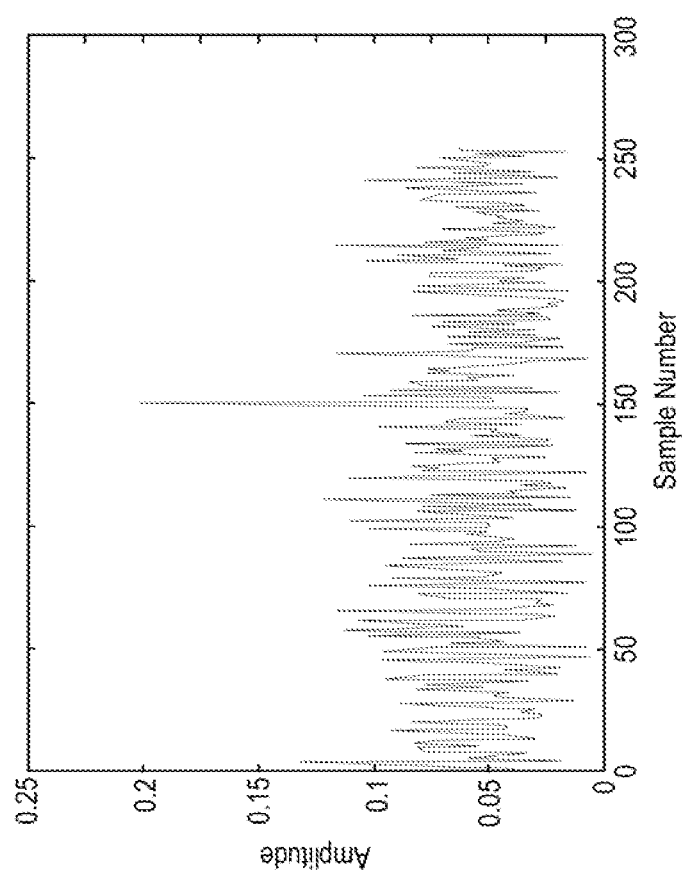
FIG. 4 is a plot of an example time-domain waveform that may be appropriate for PAR reduction using reserved OFDM tones.

FIG. 4 is a time-domain magnitude plot of a complex-baseband OFDM signal using the same system parameters as in the embodiment depicted in FIG. 3. Again, the signal space comprises 256 subcarriers, 11 of which are reserved for the purpose of PAR reduction. In the waveform depicted by FIG. 4, the highest peak may be seen as occurring in the area of sample index $n_{150}$. The waveform has a PAR of 10.45 dB.

Figure 5:
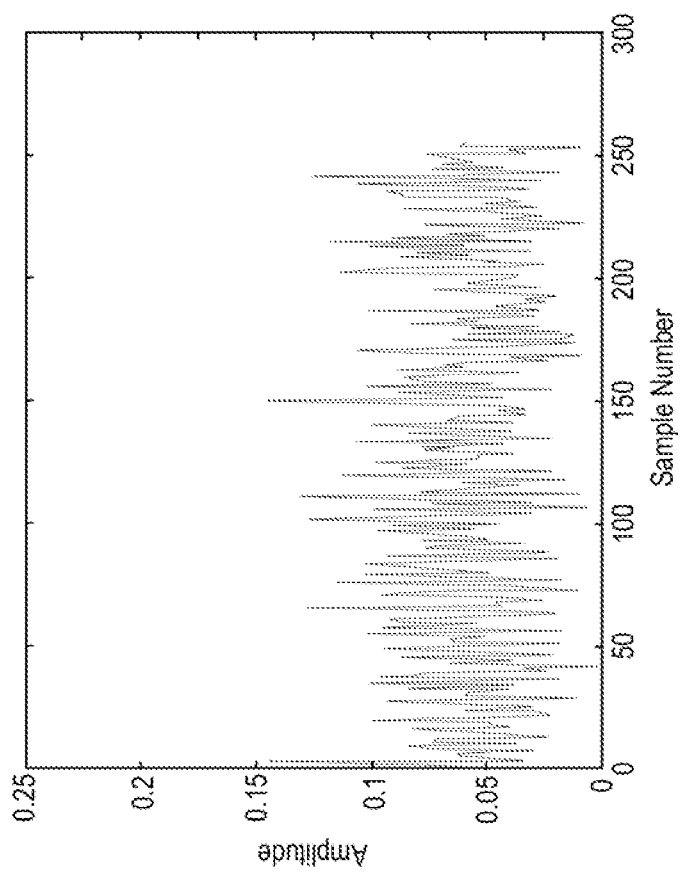
FIG. 5 is a plot of an example time-domain waveform that may result from using a single iteration of an embodiment of a PAR reduction method.

FIG. 5 is a magnitude plot of the complex-baseband OFDM signal from FIG. 4 after a single iteration of the PAR reduction method described above using the peak-reduction kernel $p_0$ depicted in FIG. 3. As a result of that single iteration, the PAR of the signal has been reduced to approximately 7.56 dB. In the depiction of FIG. 5, the peak located approximately at sample index $n_{150}$ has been reduced in magnitude to approximate that of a second peak, located in the region around sample index $n_7$.

Figure 6:
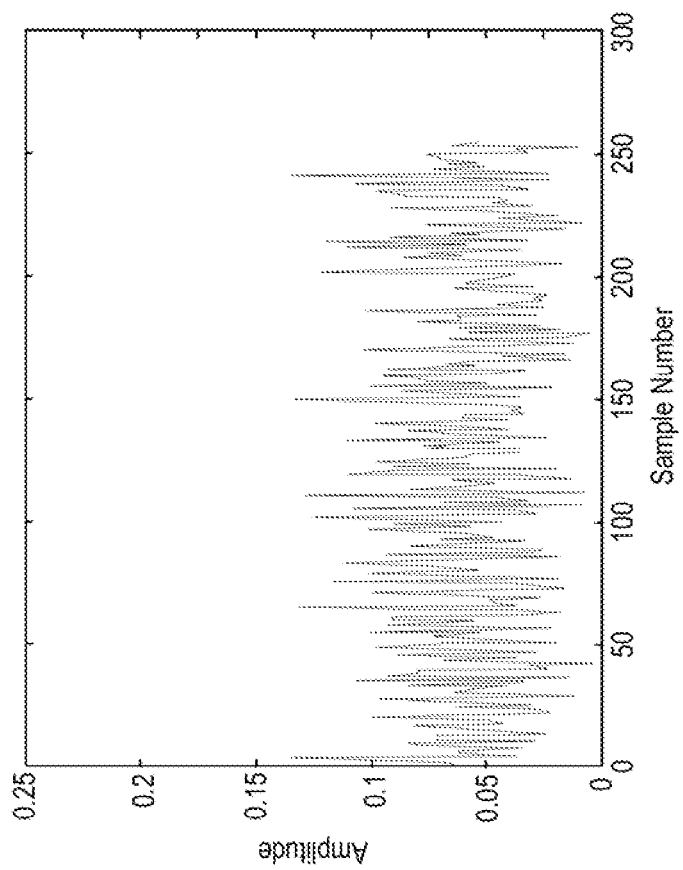
FIG. 6 is a plot of an example time-domain waveform that may result from using a second iteration of an embodiment of a PAR reduction method.

FIG. 6 is a magnitude plot of the complex-baseband OFDM signal from FIG. 3 after two successive iterations of the PAR reduction method described above using the peak-reduction kernel $p_0$ depicted in FIG. 3. As a result of these two successive iterations, the PAR of the signal has been reduced to 6.92 dB. In the depiction of FIG. 6, the peaks located approximately at sample indexes $n_{150}$ and $n_7$, respectively, have been reduced in magnitude to approximate that of a third peak, located in the area around sample index $n_{238}$.

It is to be understood that even though various embodiments and advantages have been set forth in the foregoing description, the above disclosure is illustrative only, and changes may be made in detail, and yet remain within the broad principles of the disclosed subject matter. For example, the method and system may be implemented in either software or hardware embodiments, and may comprise one or more integrated circuit devices. In some embodiments, the methods or individual steps described may be performed in a hardware implementation. In other embodiments, a software implementation may be utilized. In still other embodiments, the methods or individual steps described may be performed by a combination of hardware and software modules. Furthermore, $p_0$ may have its main pulse at any sample location other than $n_0$. Moreover, there may be other techniques for generating $p_0$.

What is claimed is:

1. A transmitter, comprising:
    a first processing block configured to generate a first peak-reducing vector; and
    a second processing block configured:
        to receive a first data vector, the data vector comprising a plurality of samples, the first data vector having a first peak with a first index and a first magnitude, a second peak with a second index and a second magnitude that is less than the first magnitude, and a first peak-to-average power ratio, and
        to generate a second data vector having a second peak-to-average power ratio that is lower than the first peak-to-average power ratio by using the first peak-reducing vector;
    wherein generating the second data vector includes:
        generating a second peak-reducing vector by shifting the first peak-reducing vector by a number of samples substantially equal to the first index;
        generating a third peak-reducing vector by scaling the second peak-reducing vector by a first coefficient, and by further scaling the second peak-reducing vector by a second coefficient; and
        generating the second data vector by combining the third peak-reducing vector with the first data vector; and
    at least one of the first processing block and second processing block is implemented by hardware.

2. The transmitter of claim 1, wherein the first coefficient comprises a complex coefficient.

3. The communications system of claim 1, wherein the second coefficient comprises a real coefficient.

4. A method for reducing peak-to-average-power ratio (PAR) in a signal, the method comprising:
    receiving a first data vector, the data vector comprising a plurality of samples, the first data vector having a first peak with a first index and a first magnitude, a second peak with a second index and a second magnitude that is less than the first magnitude, and a first peak-to-average power ratio;
    generating a first peak-reducing vector; and
    using the first peak-reducing vector to generate from the first data vector a second data vector having a second peak-to-average power ratio that is lower than the first peak-to-average power ratio
    wherein reducing the magnitude of the first peak includes:
    shifting the peak-reducing vector by a number of samples substantially equal to the first index;
    generating a second peak-reducing vector by scaling the first peak-reducing vector by a first factor substantially equal to the difference between the first and second magnitudes, and by further scaling the first peak-reducing vector by a second complex factor; and
    generating a second data vector by subtracting the second peak-reducing vector from the first data vector.

* * * * *